*Lewis Moses Impt in The Manufacture of Buttons.*
PATENTED FEB 25 1868
74764 assigned to Self & James C. Walter.
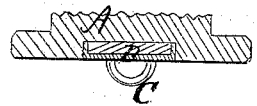
Fig: 1
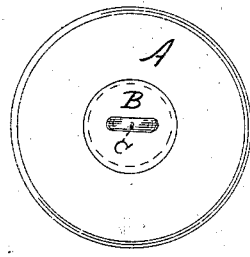
Fig: 2
Witnesses:
Theo Trische
J. A. Service
Inventor:
Lewis Moses
Per Munn & Co
Attorneys

United States Patent Office.

LEWIS MOSES, OF NEW YORK, N. Y., ASSIGNOR TO HIMSELF AND JAMES C. WALTER, OF HARLEM, NEW YORK.

Letters Patent No. 74,764, dated February 25, 1868; antedated February 7, 1868.

IMPROVEMENT IN THE MANUFACTURE OF BUTTONS.

The Schedule referred to in these Letters Patent and making part of the same.

TO ALL WHOM IT MAY CONCERN:

Be it known that I, LEWIS MOSES, of the city, county, and State of New York, have invented a new and useful Improvement in the Manufacture of Buttons; and I do hereby declare that the following is a full, clear, and exact description thereof, which will enable others skilled in the art to make and use the same, reference being had to the accompanying drawings, forming part of this specification, in which—

Figure 1 represents a central section of my improved button.

Figure 2 is an inverted plan view of the same.

Similar letters of reference indicate corresponding parts.

This invention relates to a new manner of securing the eyes or loops of glass buttons to the body of the buttons, and consists in the use of liquid glass, mixed with finely-powdered glass or other mineral matter, by which a sheet-metal plate, to which the said loop is secured, is soldered, secured, or cemented to the under side of the button, in which a recess has been formed for the purpose.

This invention is applicable to all glass or porcelain buttons and ornaments, such as breastpins, &c. Heretofore the ends of the loops were generally cast directly into the button, a process in which much care and labor are involved, and one which does not permit the construction of very thin buttons or ornaments. Various kinds of cement were tried to secure the loop to the button, but none was adhesive enough to make the article substantial and strong enough.

My composition is such that the metal plate is firmly secured to the glass button, so that, when the same is torn off by force, pieces of the glass button will remain on the cement.

A represents the glass or porcelain button or other ornament, in the under side of which a circular recess is formed. B is a sheet-metal plate, circular, with upturned edges, as shown. C is the eye or loop, and is soldered or otherwise secured to the plate B. The cup formed in the plate B is fitted with a composition of liquid glass, with a finely-powdered mineral matter, which is made of the consistency of pretty stiff paste when applied. The plate with the cement is then placed against the button, into the circular recess, and the whole is then subjected to a sufficient heat until the cement is dried.

Having thus described my invention, I claim as new, and desire to secure by Letters Patent—

1. The cement, consisting of liquid glass and finely-powdered mineral matter, substantially as described, for the purpose specified.

2. The plate B, containing the cement filled into the circular recess in the button A, and subjected to heat, as herein set forth, for the purpose specified.

L. MOSES.

Witnesses:
WM. F. MCNAMARA,
ALEX. F. ROBERTS.